US006962370B2

(12) United States Patent
Simpson

(10) Patent No.: US 6,962,370 B2
(45) Date of Patent: Nov. 8, 2005

(54) COLLAPSIBLE UTILITY TRAILER

(75) Inventor: Dennis Simpson, Minnetonka, MN (US)

(73) Assignee: Tricam International, Inc., Eden Prairie, MN (US)

( * ) Notice: Subject to any disclaimer, the term of this patent is extended or adjusted under 35 U.S.C. 154(b) by 97 days.

(21) Appl. No.: 10/409,674

(22) Filed: Apr. 7, 2003

(65) Prior Publication Data
US 2003/0218316 A1 Nov. 27, 2003

Related U.S. Application Data

(60) Provisional application No. 60/370,453, filed on Apr. 5, 2002.

(51) Int. Cl.⁷ .............................................. B62D 63/06
(52) U.S. Cl. ................ 280/789; 280/47.34; 280/87.01; 280/656
(58) Field of Search ............................. 280/789, 47, 34, 280/656, 87.01

(56) References Cited

U.S. PATENT DOCUMENTS

| | | | |
|---|---|---|---|
| 4,239,258 A | 12/1980 | Burris | |
| 4,468,046 A | 8/1984 | Rutherford | |
| 4,697,976 A | 10/1987 | Godbersen | |
| 4,746,142 A | 5/1988 | Davis | |
| 4,758,008 A | 7/1988 | Moddejonge | |
| 4,768,806 A | 9/1988 | Tetreault | |
| 4,786,073 A | 11/1988 | Harper | |
| 4,995,129 A | 2/1991 | Comardo | |
| 5,340,134 A | 8/1994 | Dodson | |
| 5,387,001 A | 2/1995 | Hull | |
| 5,544,944 A | 8/1996 | Keech | |
| 5,957,482 A * | 9/1999 | Shorter | ...................... 280/639 |
| 6,176,504 B1 | 1/2001 | Van Mill | |
| 6,213,053 B1 | 4/2001 | Lammers | |
| 6,511,092 B1 | 1/2003 | Chepa | |

\* cited by examiner

*Primary Examiner*—Eric Culbreth
(74) *Attorney, Agent, or Firm*—Patterson, Thuente, Skaar & Christensen, P.A.; Michael A. Bondi

(57) ABSTRACT

A collapsible utility trailer having a trailer bed, a trailer frame, a front pair of wheels and a rear pair of wheels. The trailer bed has at least two bed sections and each of the bed sections has a length and a width. The trailer frame has a plurality of frame sections and each of the trailer frame sections have a length and a width that are less than the length and the width of the bed sections, respectively. The trailer bed sections are attached to the trailer frame. The front and rear pairs of wheels rotatably attached to the trailer frame so that the front and rear wheels are oriented substantially below the trailer bed.

16 Claims, 10 Drawing Sheets

COLLAPSIBLE UTILITY TRAILER

RELATED APPLICATION

The present application claims the benefit of U.S. Provisional Application No. 60/370,453 filed Apr. 5, 2002, which is incorporated herein in its entirety by reference.

FIELD OF THE INVENTION

The present invention relates to the field of trailer technology, and more specifically, to light duty utility trailers of modular construction.

BACKGROUND OF THE INVENTION

Conventional trailers typically include a substantially flat bed and a wheel assembly that is attached to the bed. Trailers are typically assembled by the manufacturer and shipped to dealers where the trailers are held in inventory by the dealers until sale to the end-use customer.

Because the wheel assembly extends from the bed, it is not possible to densely stack the trailers during the distribution process. The inability to densely stack the trailers during distribution thereby increases the cost of the trailers. This factor becomes especially important when the trailers must be transported long distances during the distribution process. Reductions in shipping size of the trailer and the elimination of assembly will result in dealer cost reductions and savings to the customer.

It is also common to stow or store a trailer when not in use, rather than leave it attached to a vehicle. Unfortunately, conventional trailers are bulky and difficult to store, typically taking up an equivalent amount of space as the towing vehicle. This factor especially raises problems for residential end users desiring a light duty trailer for home remodeling or landscaping use. Such a user has limited storage space, usually only a garage. The lack of available storage usually forces the consumer to rent a trailer as needed, which, over time, is less efficient and more expensive.

There have been various trailer designs that attempt to meet the preceding needs. For example, Chepa, U.S. Pat. No. 6,511,092, describes a trailer having a modular configuration. Bed sections may be attached to or detached from the trailer depending on the intended use.

Dodson, U.S. Pat. No. 5,340,134 and Davis, U.S. Pat. No. 4,746,142, each disclose a trailer with a bed formed from two sections that are pivotally attached to each other. Pivoting the bed sections toward each other creates a recess that is adapted to retain the other portions of the trailer such as the wheels and the handle.

Harper, U.S. Pat. No. 4,786,073, and Burris, U.S. Pat. No. 4,239,258, both describe a trailer having a front bed section, a middle bed section and a rear bed section. The front and rear bed sections are pivotally attached to the middle bed section to reduce the size of the trailer for storage.

Tétreault, U.S. Pat. No. 4,768,806, discloses a trailer with a two-part bed. The two sections of the bed pivot upwardly along the center of the trailer, which permits the wheels to move towards each other to reduce the size of the trailer for storage.

Therefore, there is a need of the average consumer for a light duty trailer with lower production costs. Such a trailer would be shipped in manageable pieces and assembled by the end user after purchase, resulting in savings associated with assembly, shipping, and storage. Furthermore, there is a need for a trailer of modular design so that elements can be removed when not in use, or, be completely dismantled by the user if required. Finally, the trailer should be of a general design easily adaptable to various load requirements of the consumer.

SUMMARY OF THE INVENTION

The collapsible utility trailer of the present invention substantially meets the aforementioned needs. The present invention comprises a modular design shipped from manufacturer to dealer in boxes sized for convenient handling. Moreover, shipping costs are reduced by sizing the boxes to maximize the number of unassembled trailers that fit within the weight and volume constraints of a standardized shipping container. These reductions result in lower overall costs to the end user.

The present invention is a four-wheeled steerable trailer having a modular rectangular frame on which an elevated flatbed is disposed. The bed is defined by three separate modular steel mesh sections secured by threadable connectors. The bed is defined on all four sides by steel mesh side walls that are selectively removable or pivot to lie along the sides of the trailer. The four corners of the frame are further defined by a protruding axle to which each wheel is secured by a cotter pin. A tongue member coupled to the trailer tie rod assembly allows for pivoting of the front wheels. The tongue member is capable of coupling with a tractor or like vehicle. The trailer bed is elevated above the frame by metal posts to provide space for free tire rotation, space for the side walls to hang when lowered, and to minimize vehicle width.

The modular design is formed by integrally formed frame and body sections connected by threaded fasteners and pins. The trailer is therefore easily assembled and maintained by the user without the need for special tools or sophisticated equipment. When not in use, many storage configurations are possible. In one scenario, for example, the wheels, tongue and side walls are removed and stacked while the trailer frame and bed can set upright against a wall. Fully assembled, the trailer is used in a conventional manner wherein objects are placed on the bed with the user having the further option of lowering or removing side walls depending on the load.

In one embodiment, the trailer frame can comprise a front axle, a rear axle, and at least one longitudinal frame element that extends between the front axle and the rear axle, wherein the front axle, the rear axle and the at least one longitudinal frame element each have a length and a width that are less than the length and the width of the bed sections, respectively, and wherein the trailer bed is attached to the trailer frame. The trailer can further comprise a handle that is operably attached to the front axle. In some embodiments, the trailer can comprise a pair of side wall panels operably attached to the trailer bed, a front wall panel operably attached to the trailer bed and a rear wall panel operably attached to the trailer bed. In theses embodiments, the pair of side wall panels, the front wall panel, and the rear wall panel can be fabricated from at least one wall section, wherein the at least one wall section has a length and a width that are less than the length and the width of the bed section.

In some embodiments, the length of the trailer bed can be increased by attaching an additional bed section, wherein the additional bed section has a length and a width that are approximately the same as the length and the width of the bed sections.

In some embodiments, the bed sections, the rear axle assembly, the front axle assembly and a plurality of support brackets can be packaged in a container having a length and width that substantially corresponds with the length and width of the bed sections.

DETAILED DESCRIPTION OF THE DRAWINGS

Figure 1:
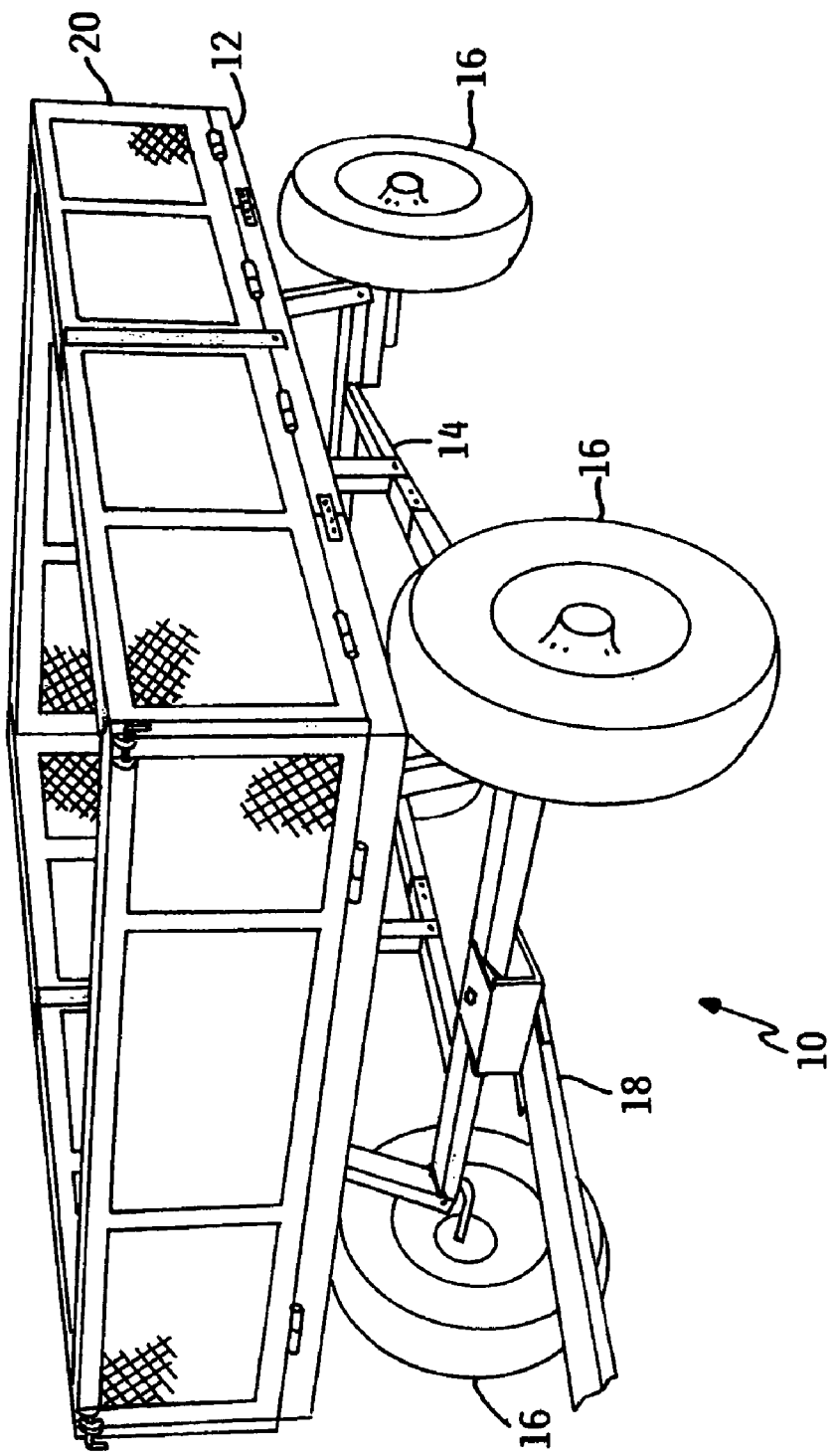
FIG. 1 is a perspective view of a collapsible utility trailer of the present invention being towed by a tractor.

The collapsible utility trailer of the present invention is shown generally at 10 in the figures. Referring to FIG. 1, the assembled trailer 10 generally includes a bed 12, a frame 14, wheels 16, running gear 18, and side walls 20.

To reduce manufacturing and distribution costs, the trailer 10 is comprised of modular elements that are assembled by the consumer. The modular design provides lower shipping costs in that the entire trailer is compactly shipped in a single compact carton rather than as a bulky completed unit. The compact packaging also alleviates storage issues for the dealer.

The design of the trailer 10 according to the present invention provides the trailer with a very strong configuration for the relatively lightweight of materials used to fabricate the trailer 10. When the trailer 10 has a length of about six feet and a width of about 6 feet, the trailer 10 has a capacity of about 2,000 pounds.

The modular design of trailer 10 provides numerous operational and storage options for the consumer. The entire structure is easily assembled or disassembled with hand tools or removal of pins. The user can quickly raise or lower selected side walls 20 depending on the width or length of the load. The length of the trailer 10 itself can be extended by adding center bed sections. After use, the trailer 10 can be dismantled or selected sections removed by the user to fit available storage space.

Figure 2:
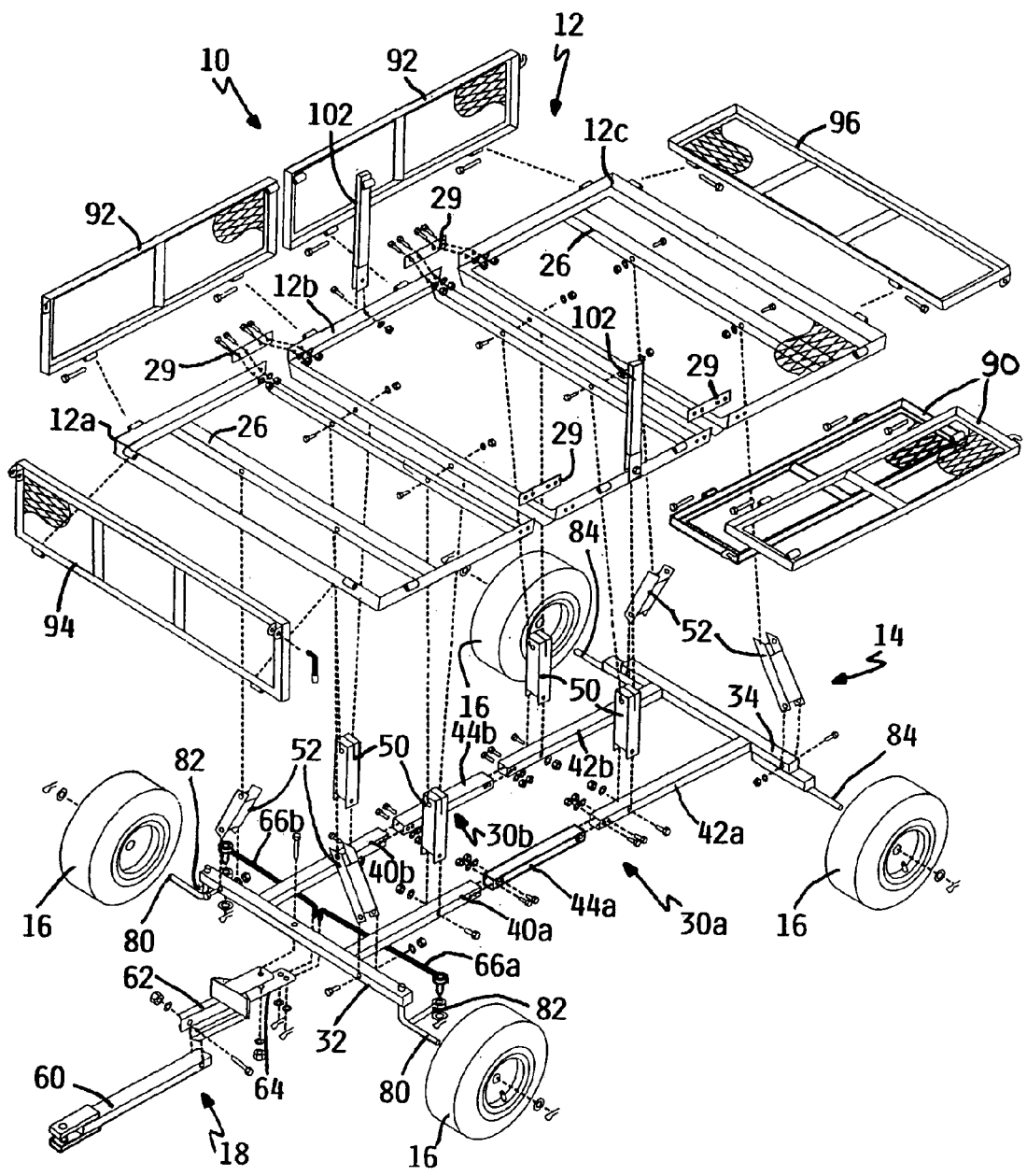
FIG. 2 is an exploded perspective view of the collapsible utility trailer.
Figure 3:
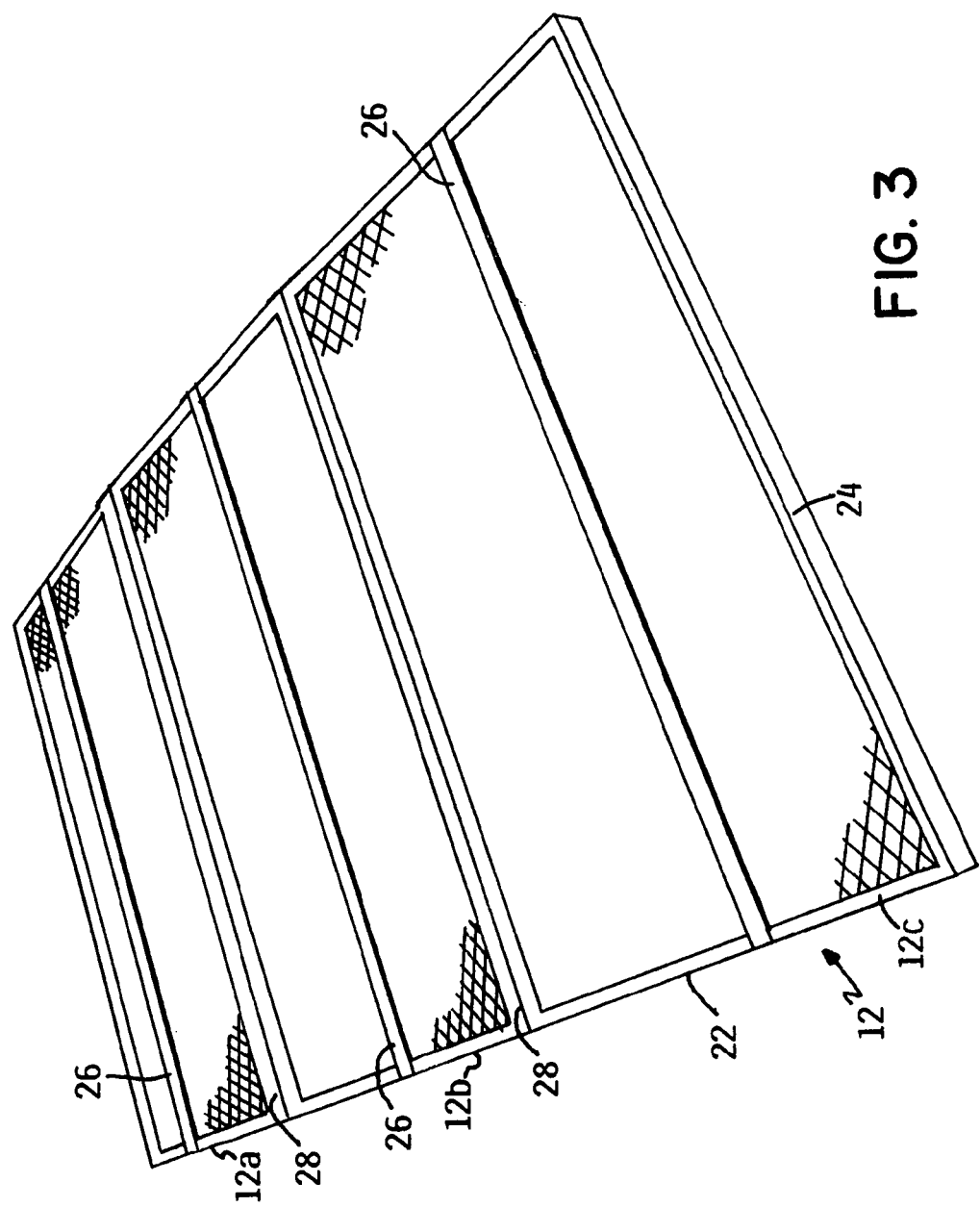
FIG. 3 is a perspective view of a lower side of a bed for the collapsible utility trailer.

Bed 12, as depicted in FIGS. 2 and 3, is preferably comprised of three equal-sized modular bed sections 12a, 12b, 12c. However, a person of ordinary skill in the art will appreciate that the concepts of the present invention may be used with different bed configurations and a different number of bed sections 12a, 12b, 12c.

The bed sections 12a, 12b, 12c each preferably have a substantially equal length and width. Each bed section 12a, 12b, 12c is defined on four sides by an angle iron 22 to which steel mesh 24 is attached along the side extending parallel to the ground. Each bed section 12a, 12b, 12c is further preferably supported by center support 26 extending laterally across each bed section 12a, 12b, 12c. The center support 26 preferably has an L-shaped configuration.

To facilitate attaching the bed sections 12a, 12b, 12c to each other and to the frame 14, a downwardly extending lip 28 is preferably provided along intersecting lateral edges of the bed sections 12a, 12b, 12c, as most clearly illustrated in FIG. 3.

Figure 4:
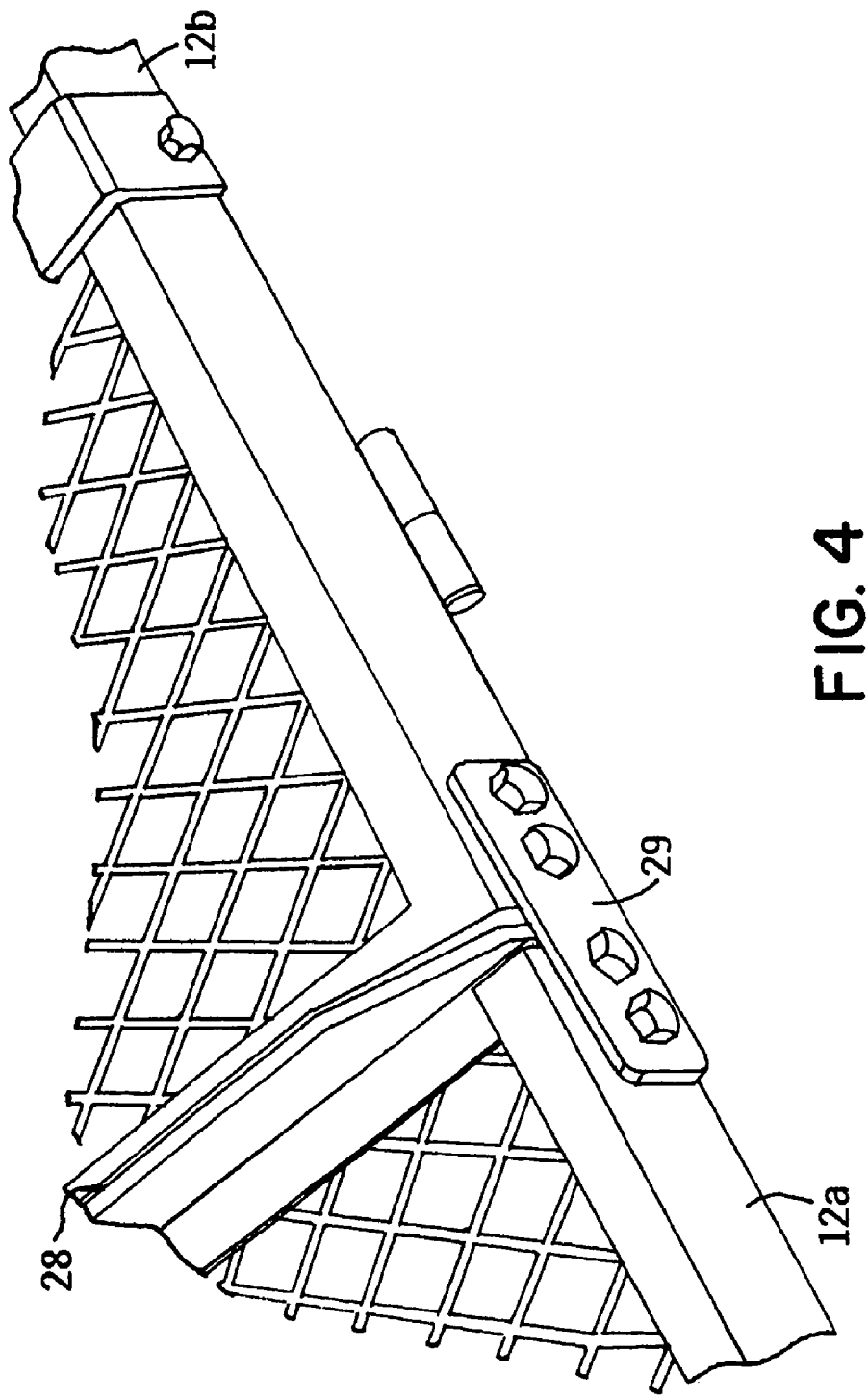
FIG. 4 is a detailed perspective view of the connector brackets for the modular bed assembly of the bed.

The center bed section 12b is preferably secured to front bed section 12a and rear bed section 12c on the outboard ends by flat brackets 29, as depicted in FIG. 4.

Figure 5:
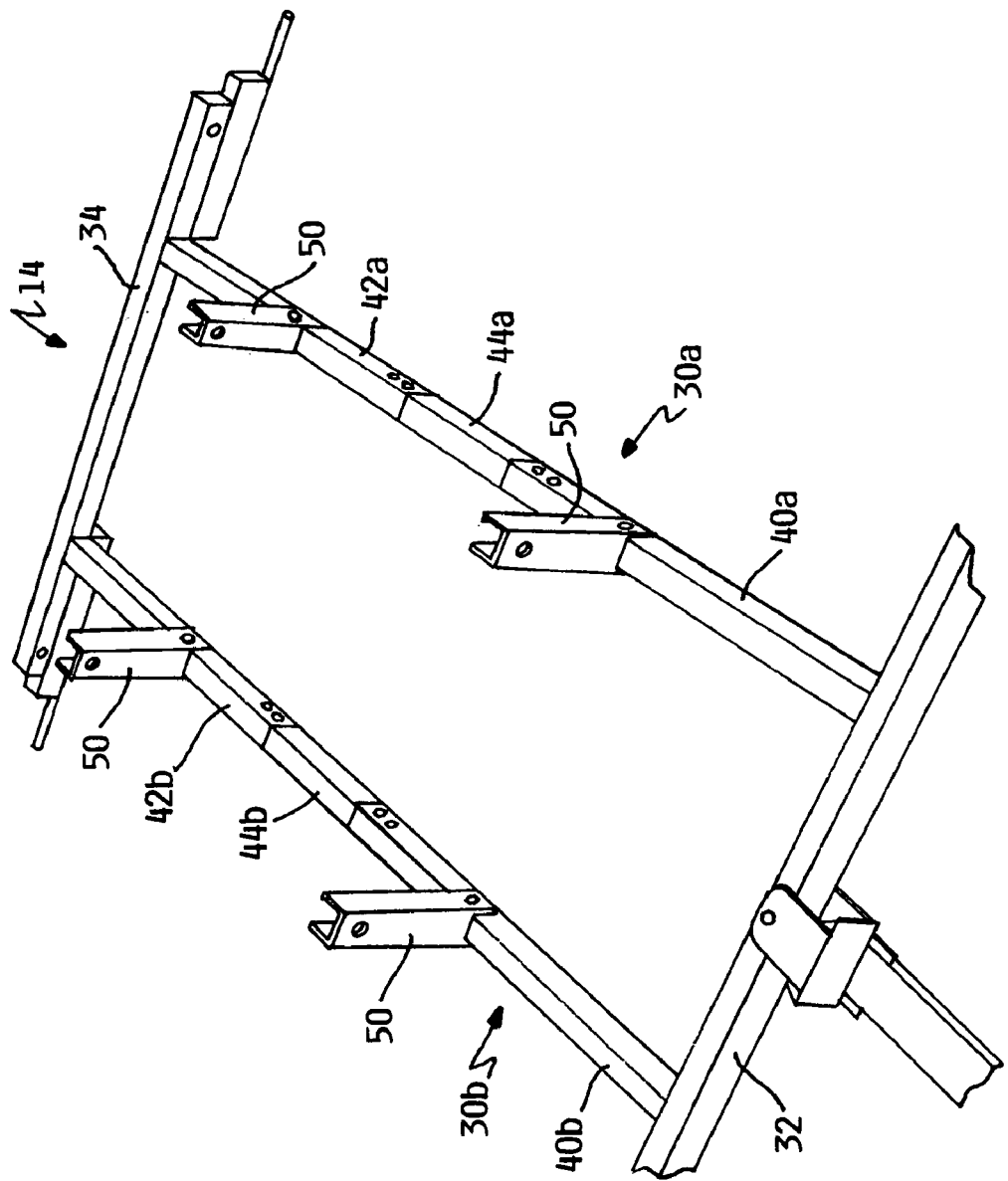
FIG. 5 is a perspective view of a frame for the collapsible utility trailer with bed frame supports attached.

The frame 14 is comprised of parallel longitudinally extending frame elements 30a, 30b positioned in spaced relationship and fixedly attached respectively to front axle frame 32 and rear axle frame 34, as illustrated in FIGS. 2 and 5. Axle frames 32, 34 each extend outward beyond longitudinal frame elements 30a, 30b for attachment of wheels 16. Each of the frame elements 30a, 30b have a length and a width that are less than the length and the width of the bed segments 12a, 12b, 12c.

Each longitudinal frame element 30a, 30b preferably has a modular construction with first segments 40a, 40b; second segments 42a, 42b; and third segments 44a, 44b. The front segments 40a, 40b are fixedly attached to and extend substantially perpendicular from the front axle frame 32.

Likewise, the second segments 42a, 42b are fixedly attached to and extend substantially perpendicular from the rear axle frame 34. The third segments 44a, 44b are attached to and extend between ends of the first segments 40a, 40b and the second segments 42a, 42b that are opposite the front axle frame 32 and the rear axle frame 34, respectively.

The inner dimensions of the metal tubes comprising the third segments 44a, 44b are preferably slightly larger than outer dimensions of the mating ends of the first segments 40a, 40b and the second segments 42a, 42b to allow insertion of the complimentary ends into the third segments 44a, 44b. The third segments 44a, 44b are preferably removably attached to the first segments 40a, 40b and the second segments 42a, 42b with bolts.

The bed 12 is elevated above the frame 14 by a series of support brackets. Four vertical bed support brackets 50 extend vertically from the frame 14, two to a side, evenly spaced on each longitudinal side element 30a, 30b. The bed support brackets 50 are spaced upon frame 14 to support the lateral edges of the center bed section 12b.

Figure 6:
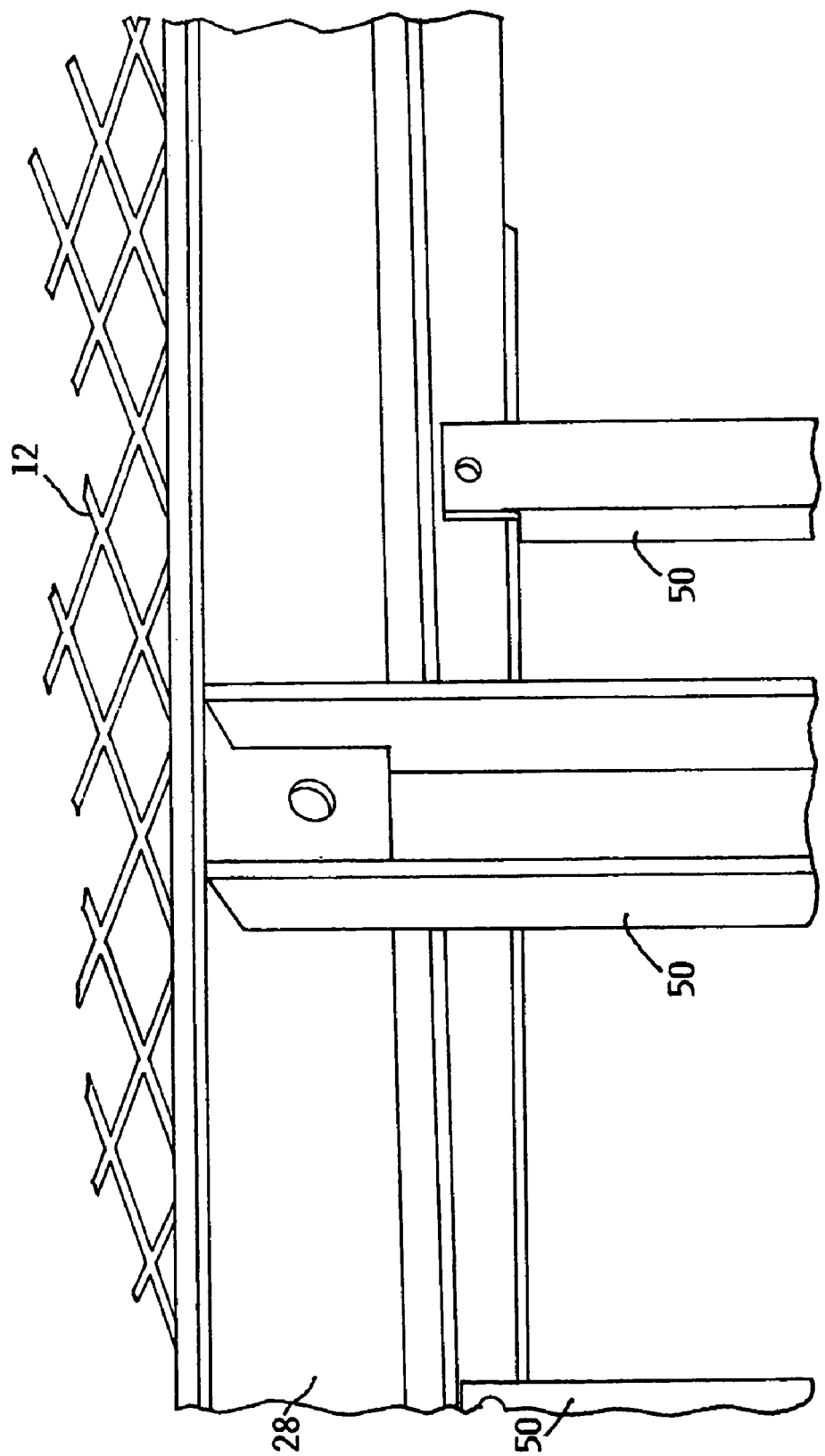
FIG. 6 is a detailed perspective view of the bed frame supports.

As depicted in FIG. 6, each bracket 50 contains a slot sized to accommodate and support the downwardly extending lip 28 of the center bed section 12b and the downwardly extending lip 28 of the front or rear bed section 12a, 12c. The vertical support brackets 50 are secured by inserting bolts through pre-drilled matching slots in the bracket 50 and corresponding holes in the downwardly extending lips 28.

Figure 7:
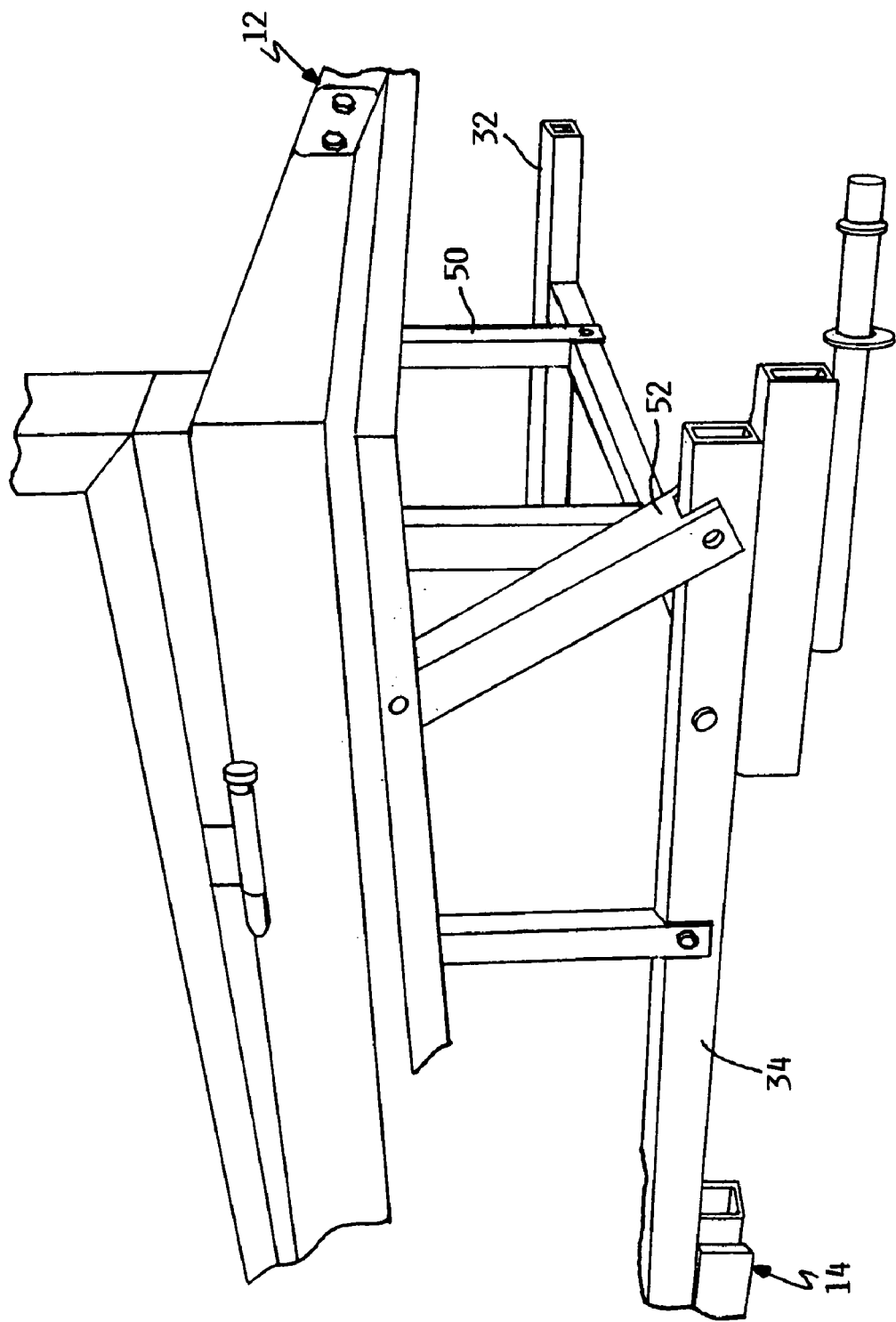
FIG. 7 is a detailed perspective view of an angled support bracket as attached to a rear axle of the collapsible utility trailer.

The four corners of the bed 12 are further elevated and supported by angled support brackets 52 extending from the outboard ends of the front axle frame 32 and the rear axle frame 34 and angled inboard to intercept the center support 26 (see FIG. 7). The angled support brackets 52 are preferably secured in place using bolts.

The trailer 10 is preferably attached to a motor vehicle or horse by the running gear 18, as illustrated in FIGS. 1 and 2 and which is conventionally known and used in trailers of various types. Running gear 18 includes a protruding wagon tongue 60 threadably connected to yoke 62 which is pivotably connected at the midpoint of forward axle frame 32 so that front wheels 16 track with movement of the wagon tongue 60.

The yoke 62 is further defined by the rod plate 64 disposed at the aft end of the yoke 62 and comprising two apertures for attaching the left and right tie rod 66a, 66b. The tongue 60 is configured for connection with a vehicle such as a tractor. The tongue 60 includes at the forward end two parallel plates defining a matching slot spaced to mate with the applicable tractor receiver (not shown), and secured by a pin. It is envisioned that the tongue 60 could be substituted with a conventional ball or other hitch style.

A first end of the tie rods 66a, 66b is attached by pins to tie rod plate 64. A second end of tie rods 66a, 66b is attached by pins to respective left and right front axle arm 82.

The front axles 80 are disposed at the outboard ends of the front axle frame 32. Each front axle 80 is "L" shaped with one leg pivotally attached to the front axle frame 32 and opposite leg sized to receive the wheel 16. (See FIG. 2.)

The front axle arm 82 is attached to the base of the front axle 80 at a first end with a second end extending towards the rear of the trailer 10 when the wheels 16 are aligned for straight travel. The front axle arm 82 contains a slot attachment for the tie rod 66a, 66b that is secured by a pin.

Since the bed 12 is elevated above the frame 14, the wheels 16 are oriented substantially beneath the bed 12. Using this configuration minimizes interference of the wheels 16 with the operation of the trailer 10 while also enhancing the load that may be carried by the trailer 10 as the wheels 16 are relatively close to the center of the trailer 10

In operation, pivoting tongue 60 produces a corresponding rotation in yoke 62, the motion transferred to the front axles 80 through the tie rods 66a, 66b. The front wheels 16 track with rotation of tongue 60. The rear axle frame 34, which includes two independent non-pivoting rear axles 84, does not pivot.

Figure 10:
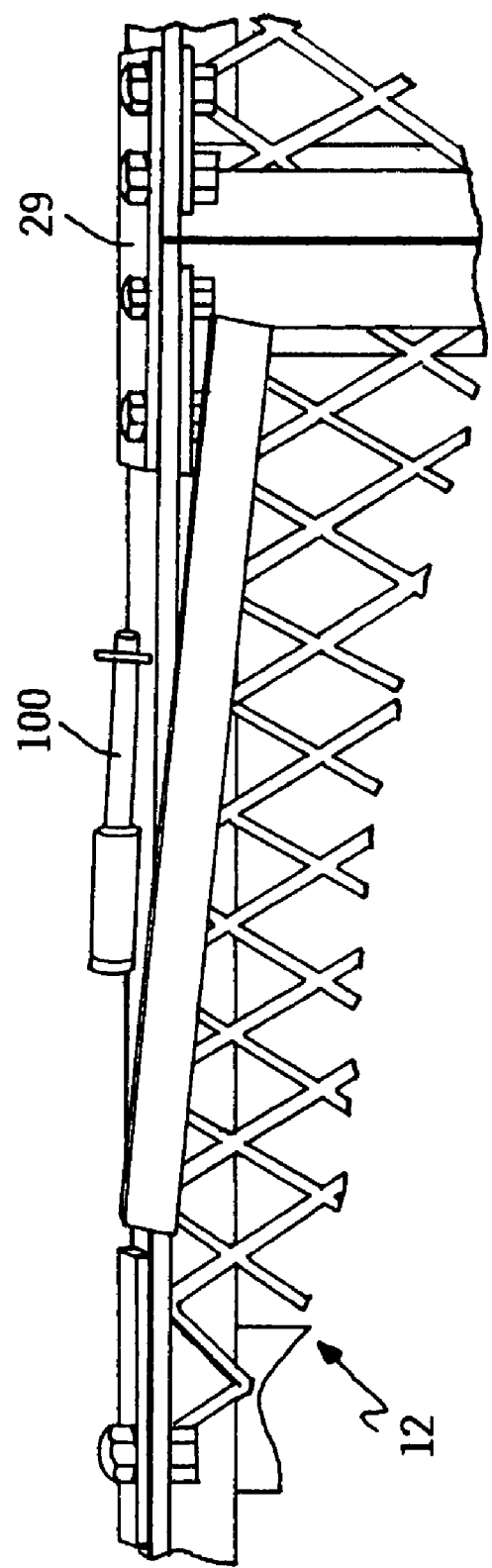
FIG. 10 is a detailed perspective view of a locking pin on the top rail of a side panel.

The trailer 10 preferably includes side walls 20 which, at the discretion of the user, can be lowered or removed. There are two left side wall panels 90, two right side wall panels 92, a front wall panel 94, and a rear wall panel 96. Like bed sections 12a, 12b, 12c, the side wall panels 20 are of a metal frame construction supporting a wire mesh, although, the side panels could be covered by an alternate material. Panel walls 92, 94, and 96 are connected at their base to bed 12 by way of a pivotable pin secured bracket mount 100 which allows the panel to rotate to a position perpendicular to the frame 14 from an upward position to a downward position (see FIG. 10).

Figure 8:
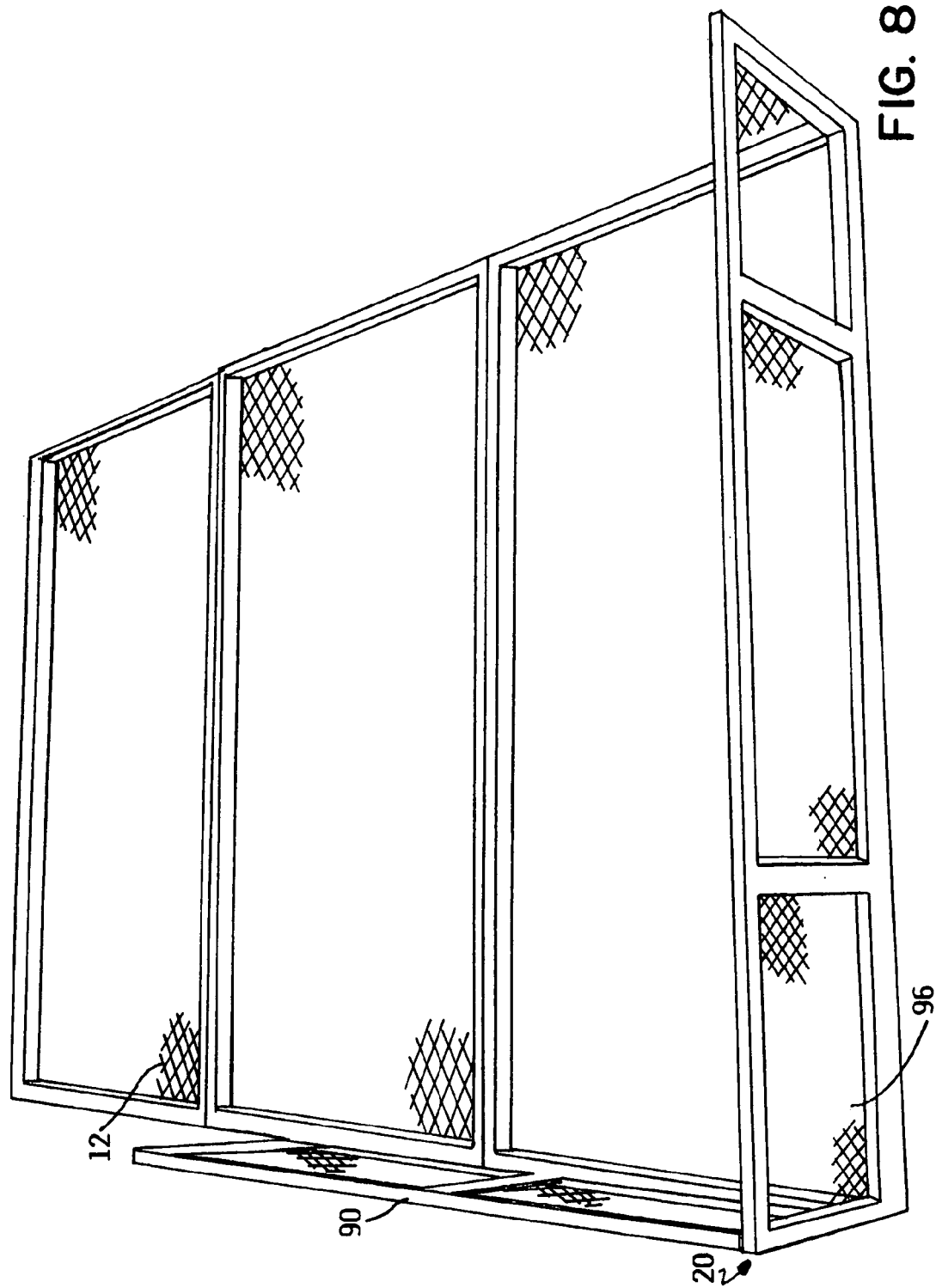
FIG. 8 is a top perspective view of the bed with side panels installed.
Figure 9:
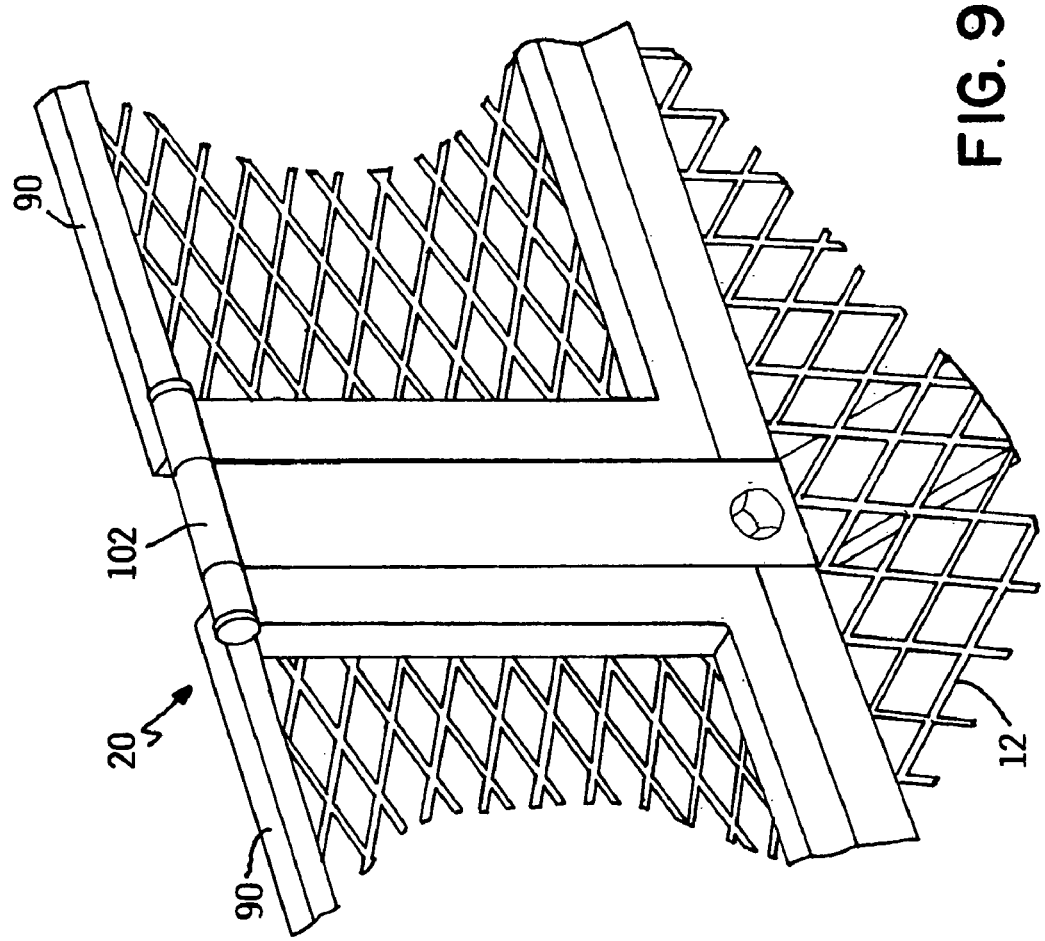
FIG. 9 is a detailed perspective view of a side panel bracket attached to the side panels.

In addition, the left side wall panels 90 and right side wall panels 92 receive support from a panel bracket 102 that extends from the bed 12 at the junction of the side panels (see FIG. 9). Pivoting of the panel bracket 102 to a position that is parallel with the bed 12 enables the bed 12 to have a substantially flat top surface. Top edges of the side panels 90, 92, 94, and 96 are secured to each other by pins at abutting edges. (See FIG. 8.)

While the trailer 10 has been described with respect to an off-road configuration, a person of ordinary skill in the art will appreciate that it is possible to also use the concepts of the present invention to manufacture a trailer 10 that complies with the applicable provisions for on-road use such as are set forth by the United States Department of Transportation.

Forming the trailer 10 with the preceding configuration enables the components of the trailer to be relatively densely packaged in a container such as a box from transportation to the desired assembly location. Packing the trailer in the container also enhances the ability of the container to be manually carried as the length and the width of the container are preferably about two feet by about three feet.

It is contemplated that features disclosed in this application can be mixed and matched to suit particular circumstances. It is specifically envisioned that an alternate embodiment would be provided with reflectors and lights appropriate for highway use. Various other modifications and changes will be apparent to those of ordinary skill.

What is claimed is:

1. A collapsible utility trailer comprising:
   a trailer bed having at least two bed sections, wherein each of the bed sections has a length and a width;
   a trailer frame comprising a front axle, a rear axle, and at least one longitudinal frame element that extends between the front axle and the rear axle, wherein the front axle, the rear axle and the at least one longitudinal frame element each have a length and a width that are less than the length and the width of the bed sections, respectively, and wherein the trailer bed is attached to the trailer frame;
   a front pair of wheels rotatably attached to the trailer frame so that the front pair of wheels are oriented substantially below the trailer bed; and
   a rear pair of wheels rotatably attached to the trailer frame so that the rear pair of wheels is oriented substantially below the trailer bed.

2. The collapsible utility trailer of claim 1, and further comprising a plurality of support beams that extend between the trailer bed and the front axle, the rear axle, and the at least one longitudinal frame element.

3. The collapsible utility trailer of claim 2, wherein the support beams have a channel formed in an upper surface thereof and wherein the channel is adapted to receive a lip that extends downwardly from at least one of the bed sections.

4. The collapsible utility trailer of claim 1, wherein each of the at least one longitudinal frame elements comprise:
   a first segment attached to the rear axle;
   a second segment attached to the front axle; and
   a third segment attached to the first segment and the second segment.

5. The collapsible utility trailer of claim 1, and further comprising:
   a pair of side wall panels operably attached to the trailer bed;
   a front wall panel operably attached to the trailer bed; and
   a rear wall panel operably attached to the trailer bed, wherein the pair of side wall panels, the front wall panel, and the rear wall panel are each fabricated from at least one wall section, wherein the at least one wall section of the pair of side wall panels has a length and a width that are less than the width and the length respectively of one of said bed sections, and the front wall panel and rear wall panel have a length and width that are less than the length and the width of the said one of said bed section.

6. The collapsible utility trailer of claim 5, wherein the pair of side panels, the front wall panel and the rear wall panel are each pivotally attached to the trailer bed for pivoting between an upward position and a downward position.

7. The collapsible utility trailer of claim 5, wherein the pair of side wall panels each comprise a first wall section and a second wall section and further comprising a panel bracket that attaches to the first wall section and the second wall section, wherein the panel bracket pivots with respect to the trailer bed substantially transverse to the direction in which the pair of side wall panels pivot with respect to the trailer bed.

8. The collapsible utility trailer of claim 1, wherein the pair of front wheels is pivotally attached to the frame.

9. The collapsible utility trailer of claim 1, and further comprising a handle that is operably attached to the front axle.

10. A collapsible utility trailer comprising:
   a trailer bed comprising at least two bed sections, wherein each of the bed sections has a length and a width;
   a trailer frame comprising
   a rear axle assembly comprising a rear axle and a pair of first segments extending therefrom, wherein the rear axle assembly has a length and a width that are less than the length and the width of the bed sections;
   a front axle assembly comprising a front axle and a pair of second segments extending therefrom, wherein the front axle assembly has a length and a width that are less than the length and the width of the bed sections;
   a pair of third segments attached to the first segments and the second segments opposite the rear axle and the front axle, respectively;
   a plurality of supports extending from the trailer frame to the trailer bed, wherein the supports maintain the trailer bed in a spaced-apart distance from the trailer frame;
   a rear pair of wheels rotatably attached to the rear axle assembly; and
   a front pair of wheels rotatably attached to the front axle assembly.

11. The collapsible trailer of claim 10, wherein front pair of wheels and the rear pair of wheels are oriented substantially below the trailer bed.

12. The collapsible utility trailer of claim 10, and further comprising:
   a pair of side wall panels operably attached to the trailer bed;
   a front wall panel operably attached to the trailer bed; and
   a rear wall panel operably attached to the trailer bed, wherein the pair of side wall panels, the front wall panel, and the rear wall panel are each fabricated from at least one wall section, wherein the at least one wall section of the pair of side wall panels has a length and a width that are less than the width and length respectively of one of said bed sections, and the front wall panel and the rear wall panel have a length and width are less than the length and the width of the said one of said bed sections.

13. The collapsible utility trailer of claim 11, wherein the pair of side panels, the front wall panel and the rear wall panel are each pivotally attached to the trailer bed for pivoting between an upward position and a downward position.

14. The collapsible trailer of claim 11, wherein the pair of side wall panels each comprise a first wall section and a second wall section and further comprising a panel bracket that attaches to the first wall section and the second wall section, wherein the panel bracket pivots with respect to the trailer bed substantially transverse to the direction in which the pair of side wall panels pivot with respect to the trailer bed.

15. The collapsible trailer of claim 10, wherein the pair of front wheels is pivotally attached to the frame.

16. The collapsible trailer of claim 10, and further comprising a handle that is operably attached to the front axle.

* * * * *

UNITED STATES PATENT AND TRADEMARK OFFICE
CERTIFICATE OF CORRECTION

| | | |
|---|---|---|
| PATENT NO. | : 6,962,370 B2 | Page 1 of 1 |
| APPLICATION NO. | : 10/409674 | |
| DATED | : November 8, 2005 | |
| INVENTOR(S) | : Simpson | |

It is certified that error appears in the above-identified patent and that said Letters Patent is hereby corrected as shown below:

On title page: Item [57], In the Abstract:

Line 9, after "wheels" insert --are--.

Column 5:

Line 28, after "10" insert --.--.

Column 6:

Line 58, delete "section" and insert --sections--.

Signed and Sealed this

Twenty-fourth Day of April, 2007

JON W. DUDAS
*Director of the United States Patent and Trademark Office*